United States Patent [19]

Mori

[11] Patent Number: 4,655,615
[45] Date of Patent: Apr. 7, 1987

[54] WRAPPED CYLINDRICAL BUSH

[75] Inventor: Sanae Mori, Nagoya, Japan

[73] Assignee: Daido Metal Company Ltd., Nagoya, Japan

[21] Appl. No.: 770,014

[22] Filed: Aug. 28, 1985

Related U.S. Application Data

[63] Continuation of Ser. No. 568,006, Jan. 4, 1984, abandoned.

[30] Foreign Application Priority Data

Apr. 20, 1983 [JP] Japan ............................ 58-59351[U]

[51] Int. Cl.$^4$ ......................... F16C 3/14; F16C 33/06
[52] U.S. Cl. .................................... 384/286; 384/397
[58] Field of Search .............. 384/286, 287, 288, 289, 384/290, 291, 292, 293, 294, 295, 296, 283, 307, 322, 397

[56] References Cited

U.S. PATENT DOCUMENTS

| | | | |
|---|---|---|---|
| 769,432 | 9/1904 | Chinn | 384/286 |
| 1,002,614 | 9/1911 | Warren | 384/292 X |
| 2,625,448 | 1/1953 | Underwood | 384/291 |
| 2,905,519 | 9/1959 | Cerness | 384/294 |
| 3,945,695 | 3/1976 | Speakman | 384/291 |

FOREIGN PATENT DOCUMENTS

2545922 10/1975 Fed. Rep. of Germany ...... 384/291

*Primary Examiner*—Stuart S. Levy
*Assistant Examiner*—Lynn M. Sohacki
*Attorney, Agent, or Firm*—Browdy and Neimark

[57] ABSTRACT

A wrapped bush adapted to be force fitted into an axial opening of a bearing housing is formed at its outer peripheral surface with one or more oil grooves. The oil groove or grooves are formed by press work such as embossing to extend obliquely relative to a line parallel to the axis of the wrapped bush such that they are in parallel to or symmetrical with each other with respect to the line. Upon wrapping a metal strip into the wrapped bush, the oil groove or grooves neither lessen the effect due to interference on the wrapped bush nor produce any crease or crack at or near the oil grooves, thereby attaining out of roundness to a desired extent.

20 Claims, 21 Drawing Figures

WRAPPED CYLINDRICAL BUSH

This application is a continuation of application Ser. No. 568,006, filed June 4, 1984, now abandoned.

BACKGROUND OF THE INVENTION

This invention relates to a wrapped cylindrical bush having an obliquely extending oil groove or grooves on its outer peripheral surface.

Heretofore, oil grooves for introduction of lubricating oil into a bearing are formed by machining in a bearing housing into which a wrapped cylindrical bush is securely force fitted.

Since such bearing housing is generally large in size and complicated in structure, it is very hard to form such oil grooves by machining, so that highly complicated and expensive machine tools are required.

In conventional bearings of the type, lubricating oil is supplied to other portions of a wrapped cylindrical bush through an oil groove or grooves on an inner peripheral surface of a bearing housing, such as by oil holes in a wrapped cylindrical bush, through an oil groove or grooves on an inner peripheral surface of the bush and into a gap (namely, oil film clearance) between the inner peripheral surface of the bush and a rotary shaft. When lubricating oil is supplied through oil holes in the bush, into the oil groove or grooves on the inner peripheral surface of the bush and into the oil film clearance in this manner, problems are caused in that control of the supply of lubricating oil is disadvantageously influenced by the rotating movement of the rotary shaft and the variation of the oil film clearance or needed quantity of lubricating oil is not effectively supplied to the other portions of the wrapped cylindrical bush.

As will become apparent from the drawings, the grooves are in communication only with the outer peripheral surface of the bush. As will be further apparent from the drawings, the term "in communication with only the outer peripheral surface of the bush" is intended to include embodiments wherein the grooves extend up to and "communicate" with the edge of the bush. The term "in communication with only the outer peripheral surface of the bush" merely means that there are no openings in the grooves which extend through the bush to the inner peripheral surface thereof or which communicate with any other passage or reservoir between the outer and inner peripheral surfaces of the bush.

SUMMARY OF THE INVENTION

It is an object of the invention to solve the problems involved in the prior wrapped cylindrical bush.

According to the invention, there is provided a wrapped cylindrical bush formed at its outer non-bearing peripheral surface with an obliquely extending oil groove or grooves, whose outer peripheral surface has no relation to lubricating action on an inner peripheral bearing surface thereof, i.e. such grooves are for supplying lubricating oil to other parts of the bush (such as those mentioned above) independent of lubricating oil supplied to the inner periphery of the bearing surface of the bush, and these grooves do not directly communicate, i.e. are blocked from, the means for feeding lubricating oil to the bearing surface, e.g. a radial hole. Such obliquely extending oil groove or grooves are arranged on the outer peripheral surface of the wrapped cylindrical bush such that they neither lessen the effect produced by interference in the wrapped cylindrical bush nor produce any crease or crack at the oil grooves in winding a metal strip into a wrapped cylindrical bush, thereby resulting in out of roundness to the desired extent. The oil groove or grooves formed on the outer peripheral surface of the wrapped cylindrical bush eliminate the need of formation of oil grooves on a bearing housing and effectively enable supplying lubricating oil to the other portions of the wrapped cylindrical bush.

The invention will become apparent from following description of preferred embodiments with reference to the accompanying drawings.

DESCRIPTION OF THE PREFERRED EMBODIMENTS

Figure 1:
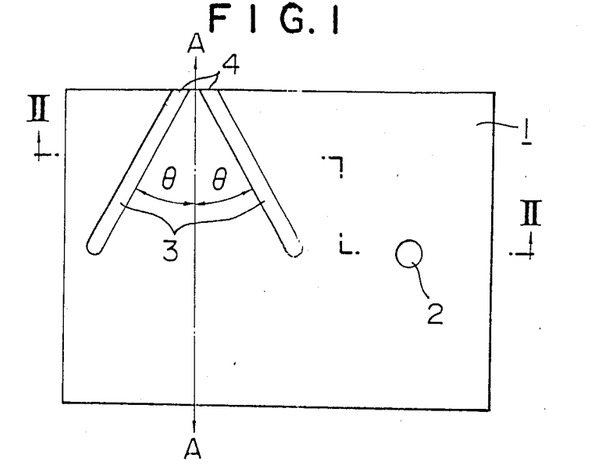
FIG. 1 is a development showing a wrapped cylindrical bush according to a first embodiment of the invention.
Figure 2A:
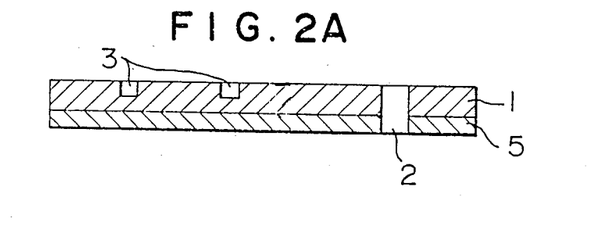
FIGS. 2A through 2C are sectional views taken along the line II—II of FIG. 1 and showing oil grooves having various sectional shapes.
Figure 2B:
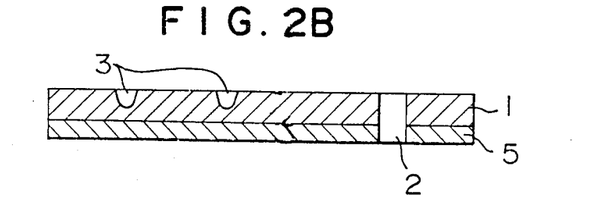
Figure 2C:
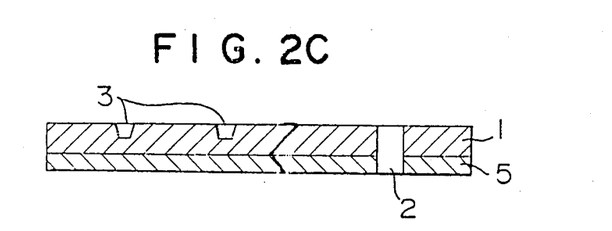
Figure 3A:
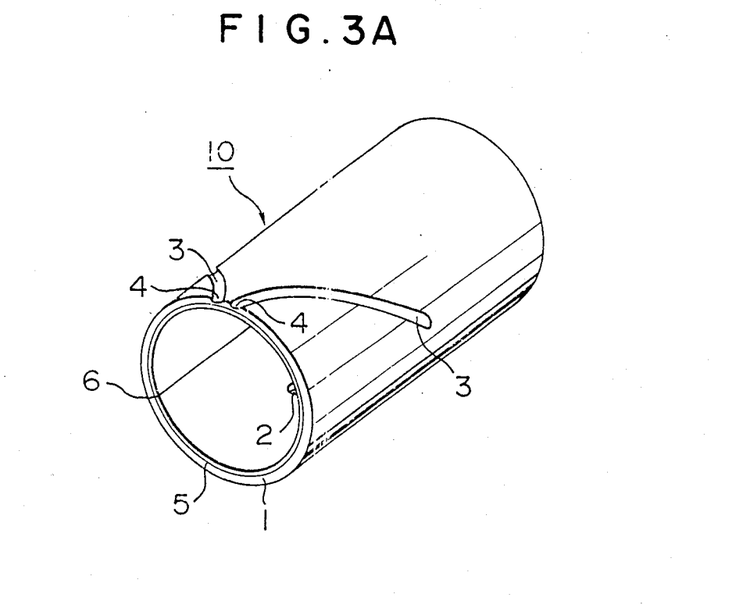
FIG. 3A is a perspective view of a wrapped cylindrical bush according to a first embodiment of the invention.
Figure 3B:
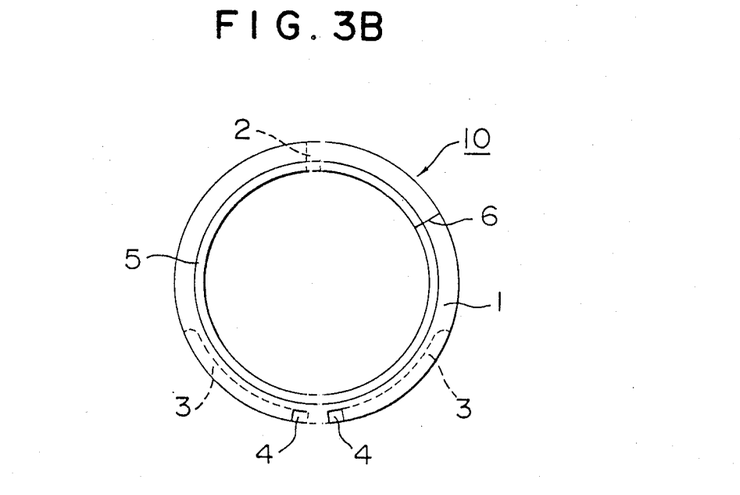
FIG. 3B is a side elevational view of the wrapped cylindrical bush shown in FIG. 3A.

FIGS. 3A and 3B show a wrapped cylindrical bush according to a first embodiment of the invention, and FIGS. 1 and 2A through 2C show a composite metal blank used for formation of the wrapped cylindrical bush.

The wrapped cylindrical bush comprises a steel backing layer 1 and a bearing alloy layer 5. As shown in FIGS. 3A and 3B, the composite metal blank consisting of the steel backing layer 1 and the bearing alloy layer 5 is wrapped to cause a contacting engagement as at 6, thereby providing the wrapped cylindrical bush 10. The bush 10 is formed at a location halfway along the axial length with an oil hole 2 radially extending through the wall of the bush. The steel backing layer 1 constituting the outer peripheral surface of the bush is formed with two oil grooves 3, each of which extends at an angle θ of inclination relative to an axial line A—A on the outer cylindrical surface of the bush. These oil grooves 3 in combination extend divergingly from one end of the bush 10 to the intermediate portion thereof, as shown in FIG. 1, but they may reach the other end of the bush. In FIGS. 3A and 3B, the oil hole 2 is positioned diametrically opposite to the axial line A—A, but the positional relationship between the oil hole 2 and the oil grooves 3 is not limited to such arrangement as shown in the drawing.

Prior to wrapping the composite metal blank into the wrapped cylindrical bush, the oil hole 2 and the pair of oil grooves 3 are formed on the composite metal blank, and it is preferable to form the oil grooves, in particular, by press work such as embossing into the steel backing 1 rather than machining in terms of mass production.

In FIG. 2A, the oil groove 3 is rectangular-shaped in cross section, but it may be semicircular or trapezoid-shaped in cross section, as shown in FIGS. 2B and 2C.

The angle θ formed between the respective oil grooves 3 and the axial line A—A on the outer peripheral surface of the bush 10 is larger than 0° and is preferably 30°. The reason for this is that if the respective oil grooves would be formed to extend in parallel to the axial line A—A, stress concentration might be produced at or near the respective oil grooves to cause creases or cracks or to diminish the effect due to interference on the bush. There are provided two oil grooves 3 on the bush of FIG. 3A which is formed of the composite metal blank shown in FIG. 1. However, the number of oil grooves is not limited to two, and may be one or three or more. The number of oil grooves is determined depending upon an amount of lubricating oil as supplied and the use of the resulting wrapped cylindrical bush.

The composite metal blank is used as a material for making wrapped cylindrical bushes of the first embodiment shown in FIGS. 1 through 3B, although a single layer plate of aluminum alloy or bronze or lead bronze can be used.

Figure 13:
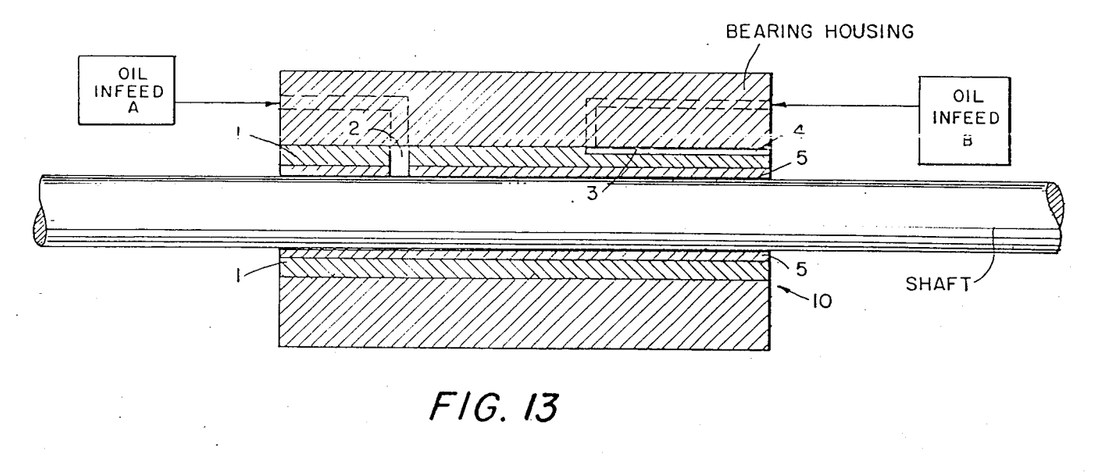
FIG. 13 is a cross sectional view of the cylindrical bush within a housing.

In operation, lubricating oil introduced from an oil hole (namely, oil passage) or oil grooves in a bearing housing (see FIG. 13) in which the wrapped cylindrical bush 10 is mounted is efficiently supplied to other portions of the bush 10 via the oil grooves 3 on the steel backing layer 1 and exit ends 4 of the oil grooves.

Figure 4:
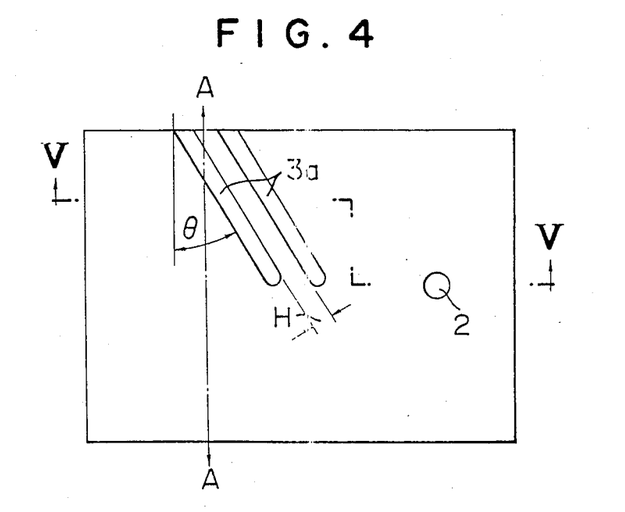
FIG. 4 is a development, as viewed from the rear, of a wrapped cylindrical bush according to a second embodiment of the invention.
Figure 5A:
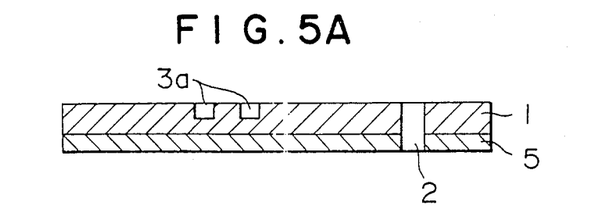
FIGS. 5A-5C are sectional views taken along the line V—V of FIG. 4 and showing an oil groove and modified forms thereof.
Figures 5B, 5C:
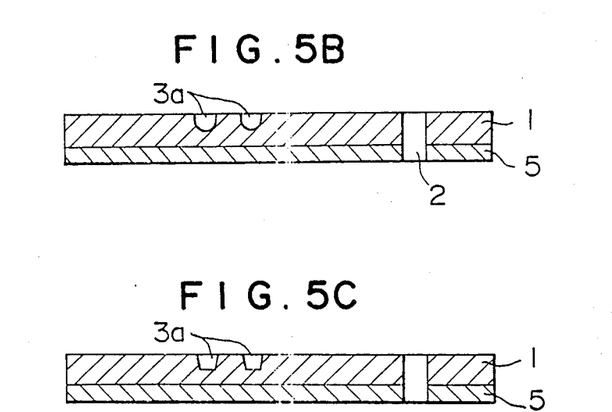
Figure 6A:
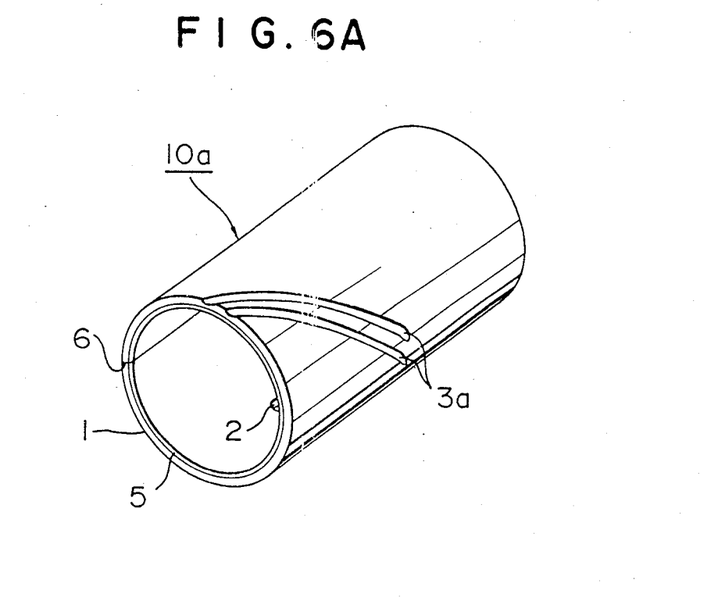
FIG. 6A is a perspective view of a wrapped cylindrical bush according to a second embodiment of the invention.
Figure 6B:
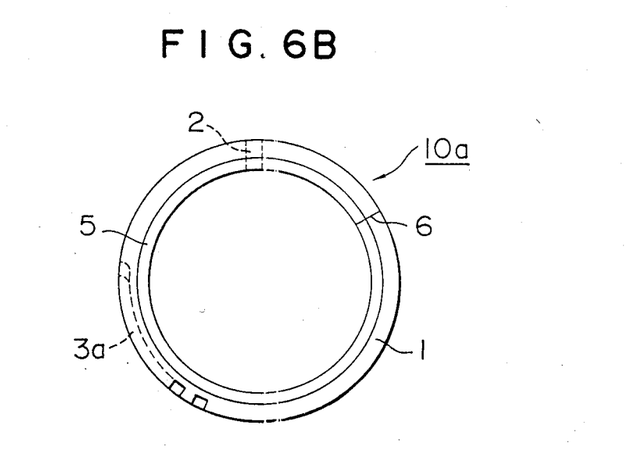
FIG. 6B is a side elevational view of the wrapped cylindrical bush of FIG. 6A.

Referring now to FIGS. 4, 6A and 6B, there is shown a wrapped cylindrical bush 10a according to a second embodiment of the invention. A composite metal blank, of which the bush 10a is formed is shown in FIGS. 4 and 5A–5C. The bush 10a is similar to the bush 10 of the first embodiment shown in FIG. 3B except for the positioning of oil grooves 3a thereof. In FIGS. 4 through 6B, similar parts to those shown in FIGS. 1 through 3B are designated by the same reference numerals. The two oil grooves 3a on the bush 10a extend in parallel to each other at an angle θ of inclination relative to the axial line A—A on the outer peripheral surface of the bush 10a.

Figure 7A:
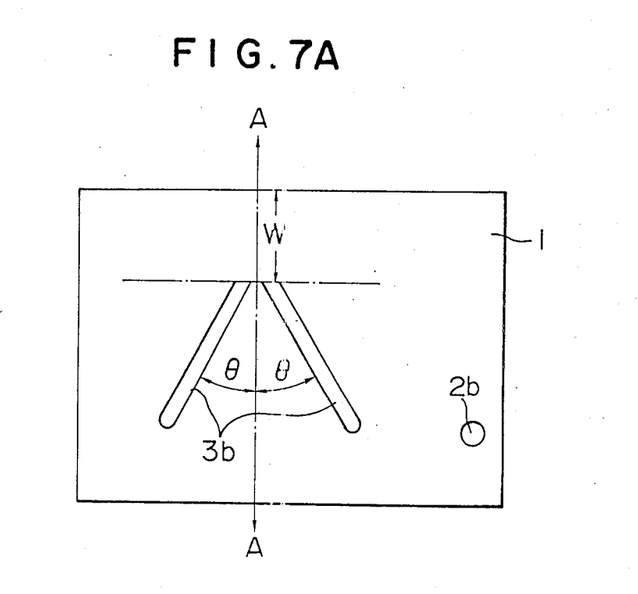
FIG. 7A is a development, as viewed from the rear, of a wrapped cylindrical bush according to a third embodiment of the invention.
Figure 7B:
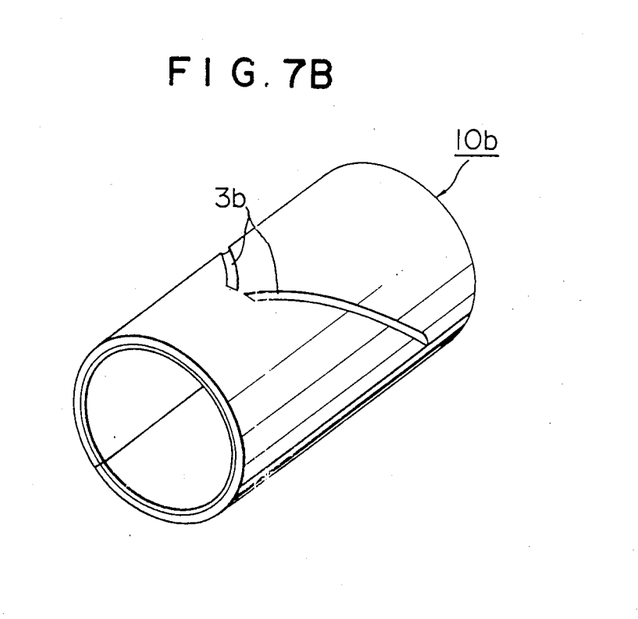
FIG. 7B is a perspective view of the wrapped cylindrical bush according to a third embodiment of the invention.

FIG. 7B shows a wrapped cylindrical bush 10b according to a third embodiment of the invention, which bush 10b is different from the bush of the first embodiment shown in FIGS. 1 through 3B in that oil grooves 3b extend from the position at a distance W away from one end of the bush 10b and an oil hole 2b is positioned near the end of the bush.

FIG. 7A shows, in development, the wrapped cylindrical bush 10b of the third embodiment of the invention, and the respective oil grooves 3b are similar in cross-sectional shape to the oil groove 3 shown in FIGS. 2A through 2C.

Figure 8A:
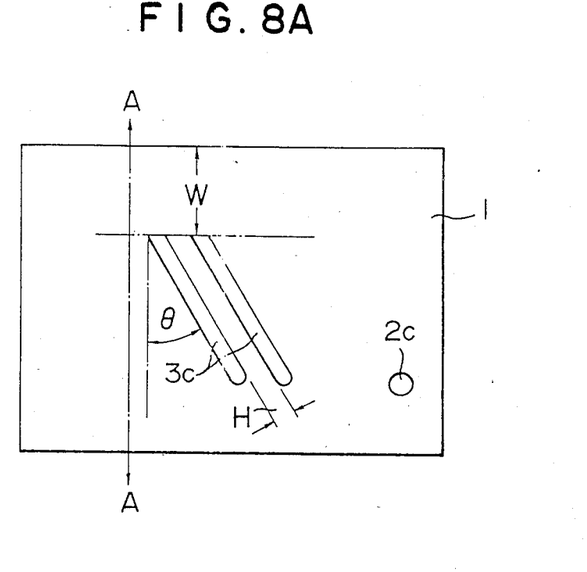
FIG. 8A is a development, as viewed from the rear, of a wrapped cylindrical bush according to a fourth embodiment of the invention.
Figure 8B:
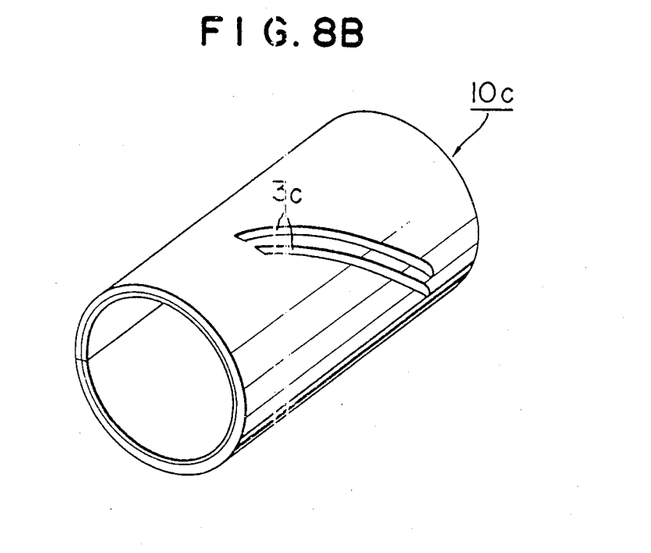
FIG. 8B is a perspective view of the wrapped cylindrical bush shown in FIG. 8A.
Figure 9:
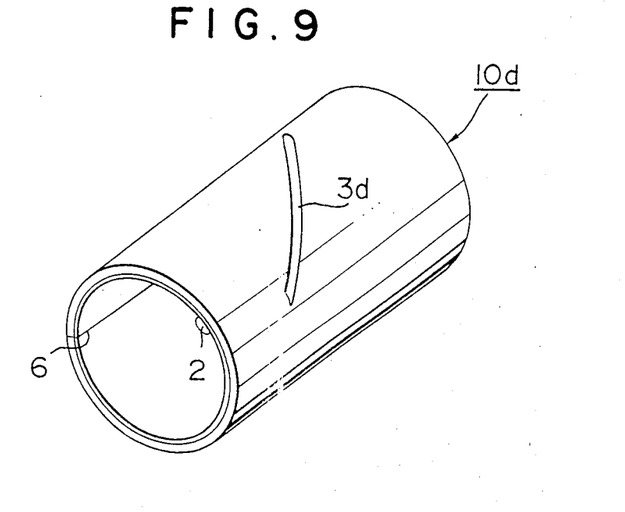
FIGS. 9 through 12 are perspective views of wrapped cylindrical bushes according to other embodiments of the invention.
Figure 10:
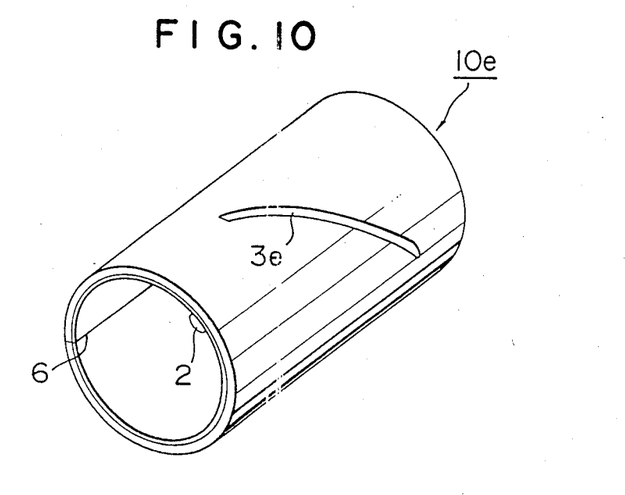
Figure 11:
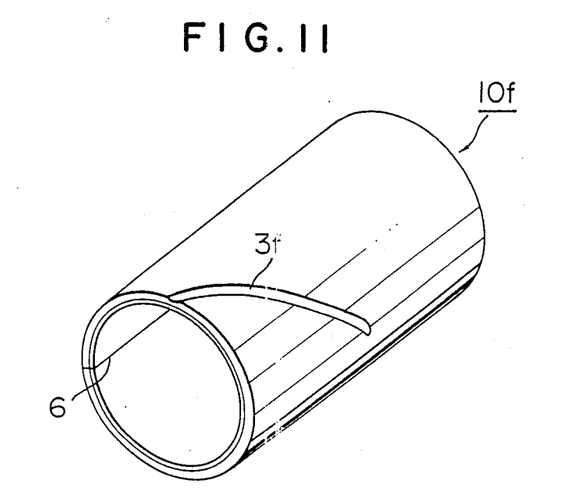
Figure 12:
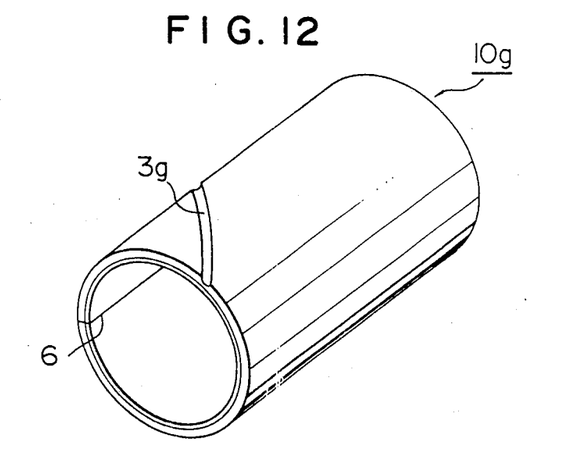

FIG. 8A shows, in development, a wrapped cylindrical bush 10c according to a fourth embodiment of the invention, which bush 10c is different from the second embodiment shown in FIG. 6A in that oil grooves 3c extend from the position at a distance W away from one end of the bush 10c and an oil hole 2c is positioned near the end of the bush.

FIGS. 9 through 12 show wrapped cylindrical bushes 10d–10g each formed at the outer peripheral surface thereof with a single oil groove 3d–3g, which bushes are suitable for supplying about half the amount of lubricating oil in the wrapped cylindrical bushes which are formed with two oil grooves.

As described above, according to the invention, there are formed obliquely extending oil groove or grooves on an outer peripheral surface of a wrapped cylindrical bush, which grooves are arranged such that out of roundness can be ensured without diminishing the effect due to interference on the bush and producing any creases or cracks upon formation of the bush. Accordingly, lubricating oil can be effectively supplied to the entire wrapped cylindrical bush and any oil grooves are not required to be formed on a bearing housing.

What is claimed is:

1. A bearing structure including a wrapped bush having an inner bearing surface and an outer peripheral non-bearing surface, force fitted into an opening of a bearing housing,
   means to supply lubricating oil to parts of the bearing structure independent of said bush bearing surface, said means including at least one oil groove formed on the outer non-bearing peripheral surface of said wrapped bush, said at least one oil groove extending on the outer peripheral surface of the wrapped bush at an angle between 0° and 90° relative to a line which is positioned on the outer peripheral surface of said wrapped bush and is in parallel to the axis of said wrapped bush; and
   means for supplying lubricating oil to said inner bearing surface in parallel with and independent of said at least one oil groove;
   said at least one oil groove being blocked from direct communication with said means for supplying lubricating oil to said inner bearing surface.

2. A wrapped bush as set forth in claim 1, wherein said oil groove or grooves extend short of the opposite ends of said wrapped bush.

3. A wrapped bush as set forth in claim 1, wherein said oil grooves extend symmetrically relative to and on the opposite sides of a line which is on the outer peripheral surface of said wrapped bush and is in parallel to the axis of said wrapped bush.

4. A wrapped bush as set forth in claim 1, wherein said means for supplying lubricating oil to said inner bearing surface comprises at least one radial through hole extending through said wrapped bush and spaced from said at least one oil groove.

5. A wrapped bush as set forth in claim 1 wherein said oil groove or grooves are rectangular, semicircular or trapezoidal shaped in cross section.

6. A wrapped bush as set forth in claim 1, wherein said wrapped bush is formed of a composite metal blank or plate including a steel backing layer and a bearing alloy layer comprising aluminum bearing alloy, bronze or lead bronze, said at least one oil groove being formed in said steel backing layer.

7. A wrapped bush as set forth in claim 1, wherein said wrapped bush is formed of a single layer metal blank of aluminum bearing alloy, bronze or lead bronze.

8. A wrapped bush as set forth in claim 2, wherein said oil grooves extend in parallel to each other with a predetermined distance therebetween or extend symmetrically relative to and on the opposite sides of a line which is on the outer peripheral surface of said wrapped bush and is in parallel to the axis of said wrapped bush.

9. A wrapped bush as set forth in claim 2, wherein said means for supplying lubrication oil to said inner bearing surface comprises at least one radial through hole extending through said wrapped bush and spaced from said at least one oil groove.

10. A wrapped bush as set forth in claim 3, wherein said means for supplying lubricating oil to said inner bearing surface comprises at least one radial through hole extending through said wrapped bush and spaced from said at least one oil groove.

11. A wrapped bush as set forth in claim 8, wherein said means for supplying lubricating oil to said inner bearing surface comprises at least one radial through hole extending through said wrapped bush and spaced from said at least one oil groove.

12. A wrapped bush as set forth in claim 2, wherein said oil groove or grooves are rectangular, semi-circular or trapezoidal shaped in cross section.

13. A wrapped bush as set forth in claim 3, wherein said oil groove or grooves are rectangular, semi-circular or trapezoidal shaped in cross section.

14. A wrapped bush as set forth in claim 4, wherein said oil groove or grooves are rectangular, semi-circular or trapezoidal shaped in cross section.

15. A wrapped bush as set forth in claim 2, wherein said wrapped bush is formed of a composite metal blank or plate having a steel backing layer and a bearing alloy layer comprising aluminum bearing alloy, bronze or lead bronze, said at least one oil groove being formed in said steel backing layer.

16. A wrapped bush as set forth in claim 3, wherein said wrapped bush is formed of a composite metal blank or plate having a steel backing layer and a bearing alloy layer comprising aluminum bearing alloy, bronze or lead bronze, said at least one oil groove being formed in said steel backing layer.

17. A wrapped bush as set forth in claim 5, wherein said wrapped bush is formed of a composite metal blank or plate having a steel backing layer and a bearing alloy layer comprising aluminum bearing alloy, bronze or lead bronze, said at least one oil groove being formed in said steel backing layer.

18. A wrapped bush as set forth in claim 2, wherein said wrapped bush is formed of a single layer metal blank or plate of aluminum bearing alloy, bronze or lead bronze.

19. A wrapped bush as set forth in claim 5, wherein said wrapped bush is formed of a single layer metal blank or plate of aluminum bearing alloy, bronze or lead bronze.

20. A wrapped bush as set forth in claim 14, wherein said wrapped bush is formed of a single layer metal blank or plate of aluminum bearing alloy, bronze or lead bronze.

* * * * *